Aug. 27, 1940.    R. POLK, SR., ET AL    2,212,925

CITRUS FRUIT JUICER

Filed Oct. 16, 1939

INVENTORS.
Ralph Polk Sr. and
Ralph Polk Jr.,
BY
Hood & Hahn
ATTORNEYS.

Patented Aug. 27, 1940

2,212,925

UNITED STATES PATENT OFFICE 2,212,925

CITRUS FRUIT JUICER

Ralph Polk, Sr., Miami, and Ralph Polk, Jr., Haines City, Fla., assignors to The Polk Development Compny (not incorporated), Tampa, Fla., a copartnership of Florida Application October 16, 1939, Serial No. 299,642

2 Claims. (Cl. 146—3)

In the apparatus for extracting juice from citrus fruits which forms the subject matter of the pending application of Polk and Polk, Serial Number 107,208, the whole fruits are cut into segments which are less than fruit-halves and these segments are passed between two mating rotary elements, one of which has an annular concave peripheral groove which engages the skin of the fruit segment and drives the segment polarwise, while the other element is axially convex and engages the pulp of the fruit segment with a rubbing action while the segment passes between the two rotary elements.

In that machine, as commercially developed, both the forwarding element and the rubbing element were of metal and were provided with axially-extending ribs, the ribs of the forwarding element scoring to bite into the external surface of the skin of the fruit segment to control the rate of polarwise movement of the fruit segment during the juicing operation.

It is essential that the fruit segments be so handled that no substantial amount of the oil content of the skin be freed to commingle with the fruit juice and it was found that a metal forwarding element of the character described, especially when used to operate upon oranges, was quite likely to either slip over the skin and thus fail to properly forward the fruit segments polarwise, or to rupture the skin and release undesirable oil.

The object of the present invention is to provide an improved forwarding roll for a fruit juicer of the type described which will insure proper forwarding of the fruit segment relative to the burr roll without oil-freeing rupture of the segment skin or peel.

The accompanying drawing illustrates an embodiment of the invention.

Figure 1:
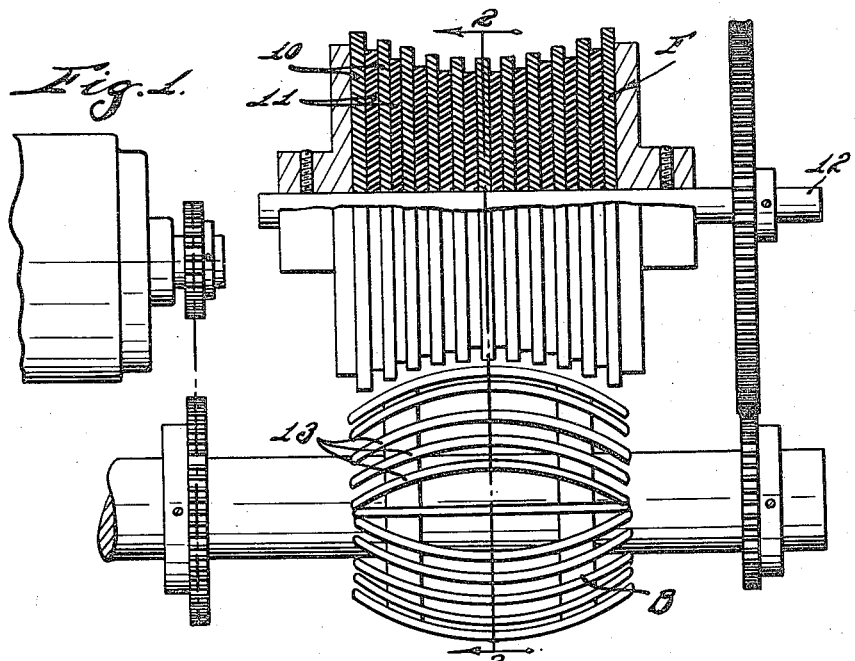
Figure 2:
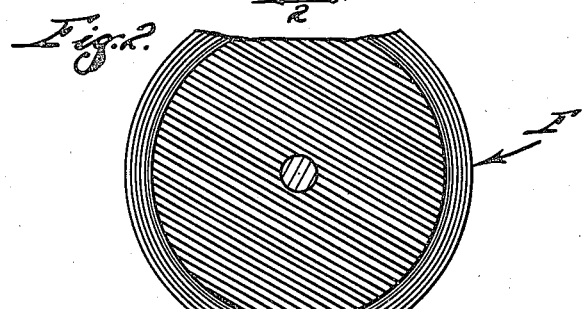

Fig. 1 is a front elevation of the improved forwarding roll and an associated burr roll;

Fig. 2 a transverse section in a plane at right angles to that of Fig. 1; and

Figure 3:
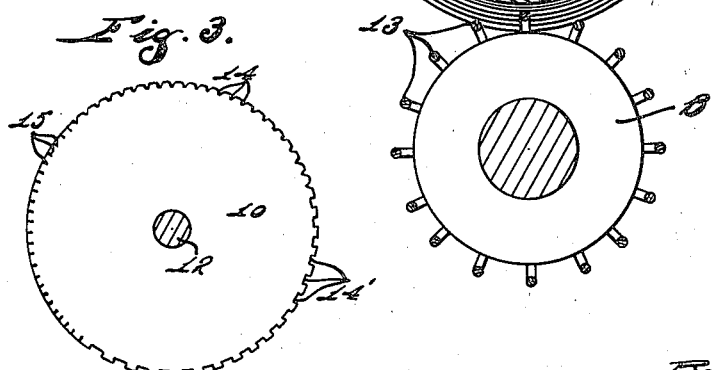

Fig. 3 an elevation, on a smaller scale, of a modified form of disc of the forwarding roll.

In the drawing F indicates the improved forwarding roll characterized fundamentally in that it provides a concave circumferential groove within which the skin or peel of a fruit segment may tangentially seat, the axial extent and depth of the groove approximating the maximum arc of the fruit segments to be handled.

The skin-engaging portions of roll F comprise the circumferential edges of a plurality of relatively thin, temporarily laterally yieldable discs or circumferential ribs axially spaced. Conveniently these ribs are rubber discs 10 of graduated diameters separated by smaller discs 11 of graduated diameters. The smaller discs 11 need not be either compressible or elastic but nevertheless may be (and most conveniently are) made of rubber.

The discs 10 and 11 are mounted on a shaft 12 so as to rotate therewith. The circumferential faces of discs 10 may be either smooth, as shown, or slightly roughened or serrated.

Cooperating with roll F is a burr roll B which is axially convexed so as to nest within the circumferential groove of roller F spaced therefrom slightly less than the normal skin thickness of the fruit segment to be handled.

The convexed surface of roll B comprises a plurality of axially-extending rubbing ribs 13.

Rolls F and B are rotated in opposite directions by suitable driving means so that the peripheral speed of roll B will be considerably greater than the peripheral speed of roll F.

In operation fruit segments of less than a fruit-half (conveniently a fruit quarter) are presented polarwise to the crotch between the two rolls. The circumferential ribs 10 of roll F are thereby compressed radially and distorted laterally so as to frictionally grip the external face of the skin of the fruit segment so as to control the rate of polarwise movement of the fruit segment while the ribs 13 of the more rapidly moving burr roll B rub and crush the juice cells thereby releasing the juice without tearing the undesirable fibers of the fruit from the skin.

While rubber is lubricated and rendered slick by the fruit juice so that a smooth or axially ribbed circumferentially grooved forwarding roll proves inefficient in an assembly of this general character, it has been found, in actual practice, that a rubber forwarding roll having the circumferentially, axially-spaced, laterally-distortable ribs or discs 10 is highly efficient both in control of polarwise movement of the fruit segments and in avoidance of skin rupture and consequent objectionable release of skin oil.

The circumferential surfaces of discs 10 may be smooth, as shown in Fig. 1, or notched as shown at 14 or 14', Fig. 3, or merely radially slit as shown at 15.

We claim as our invention:

1. In a citrus fruit juicer comprising a circumferentially grooved forwarding roll and a mating axially convexed rubbing burr nested in the groove of the forwarding roll with means for driving the two rolls in opposite directions and the rubbing burr at a substantially higher peripheral speed, the forwarding roll having axially-spaced and laterally distortable circumferential ribs defining the axially-extending concavity of the circumferential groove of the roll.

2. In a citrus fruit juicer comprising a circumferentially grooved forwarding roll and a mating axially convexed rubbing burr nested in the groove of the forwarding roll with means for driving the two rolls in opposite directions and the rubbing burr at a substantially higher peripheral speed, the forwarding roll having axially-spaced compressible and laterally distortable circumferential rubber ribs defining the axially-extending concavity of the circumferential groove of the roll.

RALPH POLK, Sr.
RALPH POLK, Jr.

CERTIFICATE OF CORRECTION.

Patent No. 2,212,925. August 27, 1940.

RALPH POLK, SR., ET AL.

It is hereby certified that error appears in the above numbered patent requiring correction as follows: In the grant, line 8, title of invention, for "CARBURETORS" read --CITRUS FRUIT JUICERS--; and that the said Letters Patent should be read with this correction therein that the same may conform to the record of the case in the Patent Office.

Signed and sealed this 24th day of September, A. D. 1940.

(Seal)

Henry Van Arsdale,
Acting Commissioner of Patents.